Oct. 17, 1933.　　　　　F. WILKES　　　　　1,931,278

LUBRICATING APPARATUS

Filed June 15, 1932

INVENTOR
Frederic Wilkes
By
Archworth Martin
attorney

Patented Oct. 17, 1933

1,931,278

UNITED STATES PATENT OFFICE 1,931,278

LUBRICATING APPARATUS

Frederic Wilkes, Wilkinsburg, Pa.

Application June 15, 1932. Serial No. 617,280

3 Claims. (Cl. 184—103)

My invention is hereinafter described as employed in connection with the lubrication of machinery, but it is applicable also to other purposes where an automatically-controlled flow of liquid is desired.

One object of my invention is to provide means for maintaining a constant level in oil reservoirs such as are commonly associated with bearings of various types.

Another object of my invention is to provide an improved form of oil-feeding device for supplying lubricant to the bearings of machinery, and one which will not become loosened through vibration.

Still another object of my invention is to provide means whereby the feeding device may be adjusted for automatically maintaining a liquid pool at any one of desired levels.

A further object of my invention is to provide an oil discharge spout of improved form.

Figure 1:
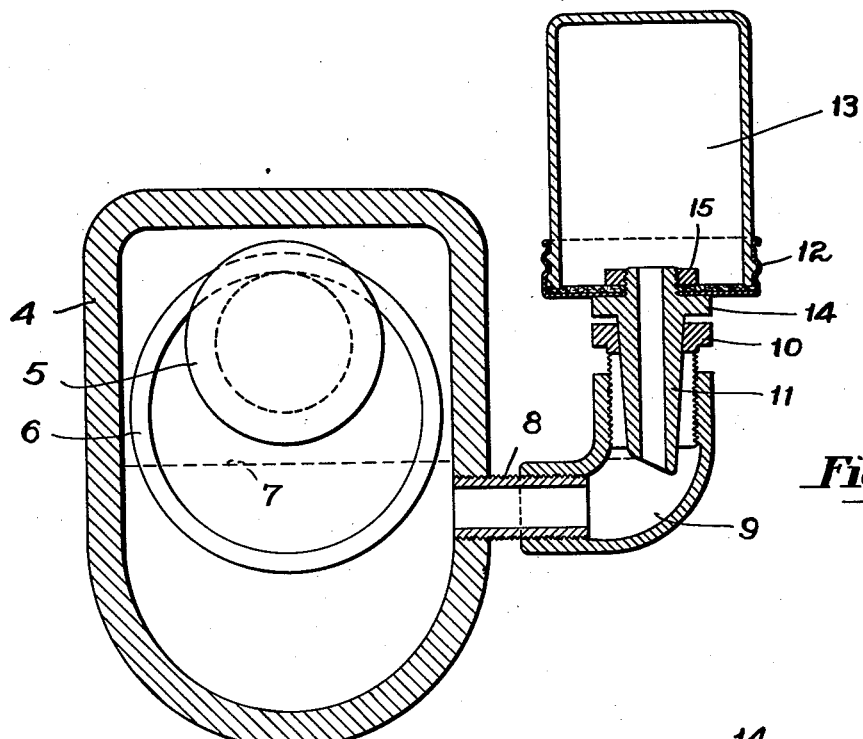
Figure 2:
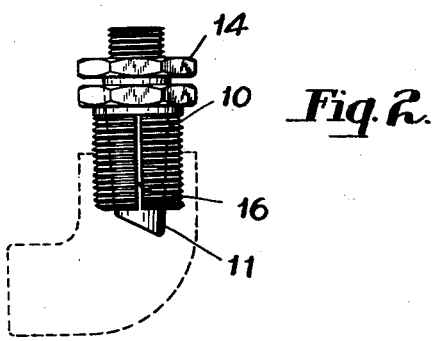
Figure 3:
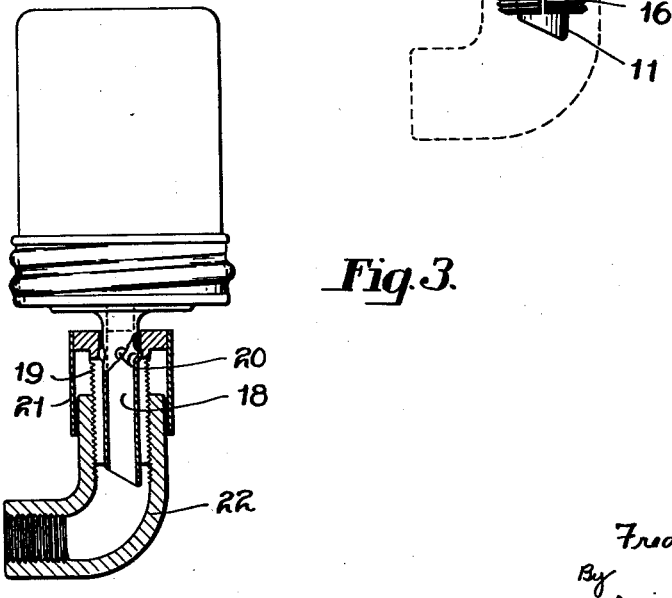

Some of the forms which my invention may take are shown in the accompanying drawing, wherein Figure 1 is a sectional view showing my oil-feeding device connected to a bearing housing; Fig. 2 is an elevational view of certain of the parts of Fig. 1, and Fig. 3 is a view showing a modification of the oil-feeding device of Fig. 1.

The numeral 4 indicates a portion of the bearing housing of a motor shaft 5, and an oil ring 6 is carried by the shaft for the purpose of conveying lubricant thereto from the pool of oil in the bearing housing, the level of such pool being indicated at 7.

The nipple 8 is threaded into the bearing housing and carries an L 9, and these members together serve as a conduit for flow of oil to the bearing housing. A bushing 10 has threaded engagement with the L 9 and is tapered interiorly for the reception of a tapered spout 11 that extends through the lid 12 of an oil receptacle 13. The spout is provided with a shoulder or flange 14 against which the lid 12 seats, and a nut 15 which has screw-threaded engagement with the upper end of the spout serves to clamp the lid 12 and the spout firmly together. The receptacle 13 may be metal, glass, or other suitable material.

The receptacle 13 is filled with oil previous to inverting the same to place the spout in the bushing 10. The lower end of the spout terminates at approximately the plane of the oil level 7, it being understood that the conduit 8 and the L 9 also contain oil which has the same level in the L 9 as the level 7 in the bearing housing.

As the oil level falls, air will, of course, be admitted to the lower end of the spout 11, so that more oil may flow from the receptacle 13 to the bearing housing.

The bushing 10, by reason of its threaded connection with the L 9 can be adjusted vertically to vary the distance which the spout 11 extends into the L, so that the oil level in the bearing housing may be maintained at any desired predetermined height. Since the oil level in the bearing housing may be above the conduit 8, I provide means for admitting air to the lower end of the spout without the necessity of passing the air through the conduit 8.

This means consists of vertical grooves or slots 16 formed in the sides of the bushing 10 and extending from a point above the L to the lower extremity of the bushing. When the oil level in the L 9, and consequently in the housing 4, falls below the lower end of the spout, air will be admitted to the spout through the grooves 16, and allow the supply of air in the bearing housing to be replaced.

The tapered arrangement of the spout 11 and the inner wall of the bushing 10 insures snugness of fit between the spout and the bushing, and excessive vibration of the spout and its container is prevented.

Another important feature of my invention resides in the inclined or bevelled shape of the lower extremity of the spout 11. This arrangement reduces tendency for a film of oil to form across the lower end of the spout, by capillary attraction, which would prevent admission of air to, and flow of oil from the spout. The diameter of the spout and the viscosity of the oil are such that ordinarily there will be proper movement of oil and air through the spout, but if the oil is colder than normal temperatures, there is a tendency for it to flow sluggishly and for a film to form across the lower end of the spout, especially if the spout be of the usual form. By the bevelled arrangement referred to, there is far less likelihood of an oil film forming across the end of the spout.

Referring now to Fig. 3, I show an arrangement similar to that in Fig. 1, but wherein the spout 18 and the inner wall of the bushing 19 may be tapered or straight, as desired. In this structure, the spout is provided with a number of protuberances 20, that, by reason of the yieldability of the metal of which the spout is formed, will snap into complementally-formed recesses or a groove in the bushing 19, so that the spout and the receptacle will be held against accidental displacement, but can nevertheless conveniently be inserted and removed.

While the structure of Fig. 3 shows the spout as being formed integrally with the lid of the receptacle, it will be understood that the spout may be formed separately and connected to the lid in any suitable manner, as shown for example in Fig. 1.

The bushing 19 is provided with a downwardly-extending hood or skirt member 21, which is suitably secured to or formed integrally with the upper end of the bushing, and cooperates with the sides of the connecting conduit 22, to prevent the entrance of foreign matter, such as dust, water, etc., to the interior of the conduit. The member 21 is preferably elongated sufficiently to encircle the sides of the conduit 22 for all positions of vertical adjustment of the bushing. Sufficient clearance is provided between the skirt and the sides of the conduit to permit entrance of air into the conduit. The bushing 10 may be provided similarly with a protecting member.

I claim as my invention:—

1. Lubricating apparatus comprising an L-shaped conduit adapted for communication with a bearing housing, with one leg of the conduit extending vertically and being internally threaded, a bushing having a continuous peripheral flange of greater diameter than the said L and a longitudinally slotted and threaded shank portion for cooperative engagement with said threaded leg, the slot serving as an air passage or vent, a skirt carried by and depending from said flange, the said skirt lying in closely spaced relation to the said leg and permitting circulation of air through said passage, and an oil container having a spout extending into the said bushing and supported thereby.

2. Lubricating apparatus comprising an L-shaped conduit adapted for communication with a bearing housing, with one leg of the conduit extending vertically and being interally threaded, a bushing having a continuous peripheral flange of greater diameter than the said L and a longitudinally slotted and threaded shank portion for cooperative engagement with said threaded leg, the slot serving as an air passage or vent, a skirt carried by and depending from said flange, the said skirt lying in closely spaced relation to the said leg and permitting circulation of air through said passage, and an oil container having a spout extending into the said bushing and supported thereby, the said spout terminating above the horizontal leg of the conduit.

3. Lubricating apparatus comprising an L-shaped conduit adapted for communication with a bearing housing, with one leg of the conduit extending vertically and being internally threaded, a bushing having a continuous peripheral flange of greater diameter than the said L and a longitudinally slotted and threaded shank portion for cooperative engagement with said threaded leg, the slot serving as an air passage or vent, a skirt carried by and depending from said flange, the said skirt lying in closely spaced relation to the said leg and permitting circulation of air through said passage, and an oil container having a spout extending into the said bushing and supported thereby, the spout snugly fitting the interior of the bushing adjacent to its lower end and having protuberances near its upper end yieldably engaging complemental recesses formed in the bushing.

FREDERIC WILKES.